Dec. 16, 1952

J. A. MASON 2,622,230

SWITCH CONTROL DEVICE FOR DYNAMICALLY
BRAKED, ELECTRICALLY DRIVEN MACHINES

Filed May 31, 1949

INVENTOR
James A. Mason
By Watson, Cole, Grindle & Watson

INVENTOR
James A. Mason
By Watson, Cole, Grindle & Watson

Patented Dec. 16, 1952

2,622,230

UNITED STATES PATENT OFFICE 2,622,230

SWITCH CONTROL DEVICE FOR DYNAMICALLY BRAKED, ELECTRICALLY DRIVEN MACHINES

James Arthur Mason, London, England, assignor to Molins Machine Company Limited, London, England, a British company Application May 31, 1949, Serial No. 96,348
In Great Britain June 9, 1948

2 Claims. (Cl. 318—12)

This invention concerns improvements in or relating to switch control devices for dynamically braked, electrically driven machines.

In British Patent 628,299, in the name of Harvey et al., accepted August 25, 1949, there are described dynamic braking arrangements for electrically driven machines in which dynamic braking is instituted when the contacts of a timing switch are disengaged. The timing switch described consists of a pair of spring contacts which are separated at the desired instant by a cam or the like driven from the machine, the object of that invention being chiefly to provide means whereby the moving parts of the machine are always caused to stop in the same position relatively to a fixed point on the machine.

If a machine of this nature is driven by any form of variable speed gearing it will be obvious that the momentum of the moving parts will depend on the gear ratio employed so that a switch such as the one referred to above, which disengages at a constant position of the cam revolution, will not provide satisfactory dynamic braking because, depending on the speed of the machine, the moving parts may go beyond or stop before the desired stopping position is reached.

According to the present invention there is provided a switch control device for use with dynamically braked, electrically driven machines comprising variable speed gearing for driving the machine, said device comprising means for adjusting the switch relatively to the cam or the like which operates it so as to vary the instant of disengagement of the contacts in accordance with variations in the adjustment of the variable speed gearing. The switch may comprise a pair of contacts mounted on a member or switch body arranged for rotation about an axis, a cam for operating the switch and a coupling member between the switch body member and the adjusting mechanism of the variable speed gear whereby alteration of the gear ratio causes the switch body member to rotate on its axis and shift the contacts relatively to the cam.

One way of carrying the invention into effect will be described with reference to the accompanying drawings in which:

Figure 5 shows part of a circuit of a driving motor for the machine.

Figure 1:
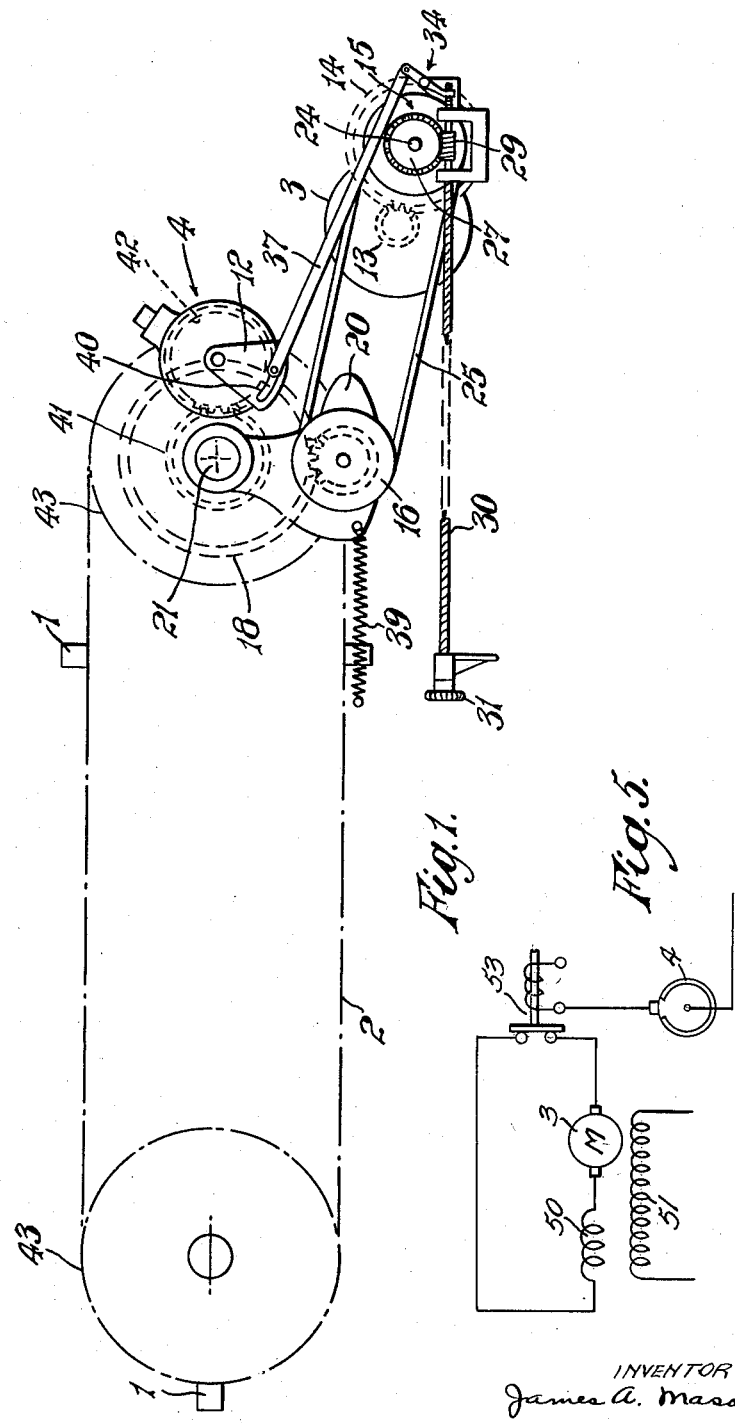
Figure 1 is a diagram (not to scale) showing the application of the invention to a packet wrapping machine.
Figure 3:
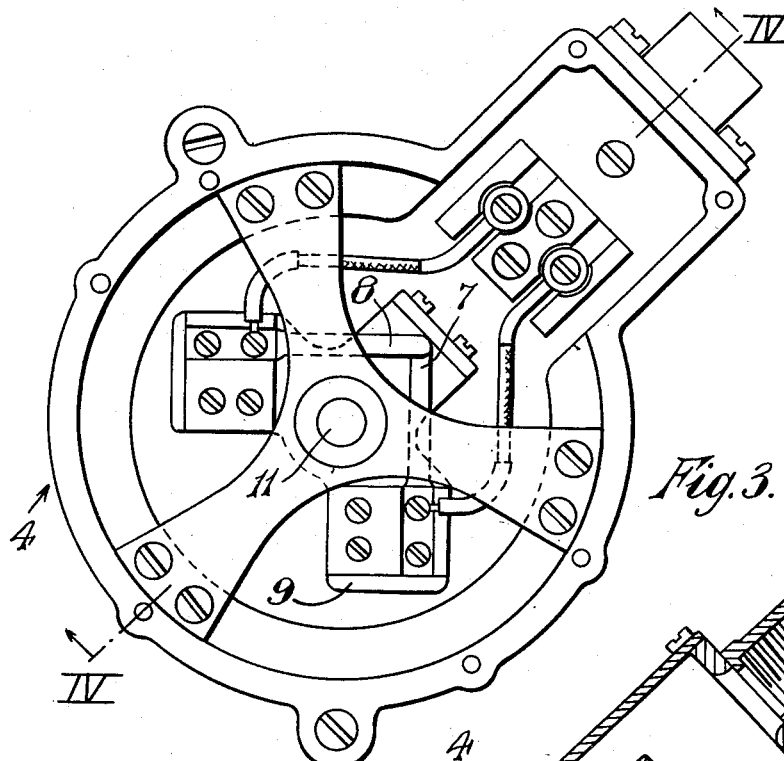
Figure 3 is a front elevation of a switch shown in Figure 1 drawn to a larger scale and with the cover removed.
Figure 4:
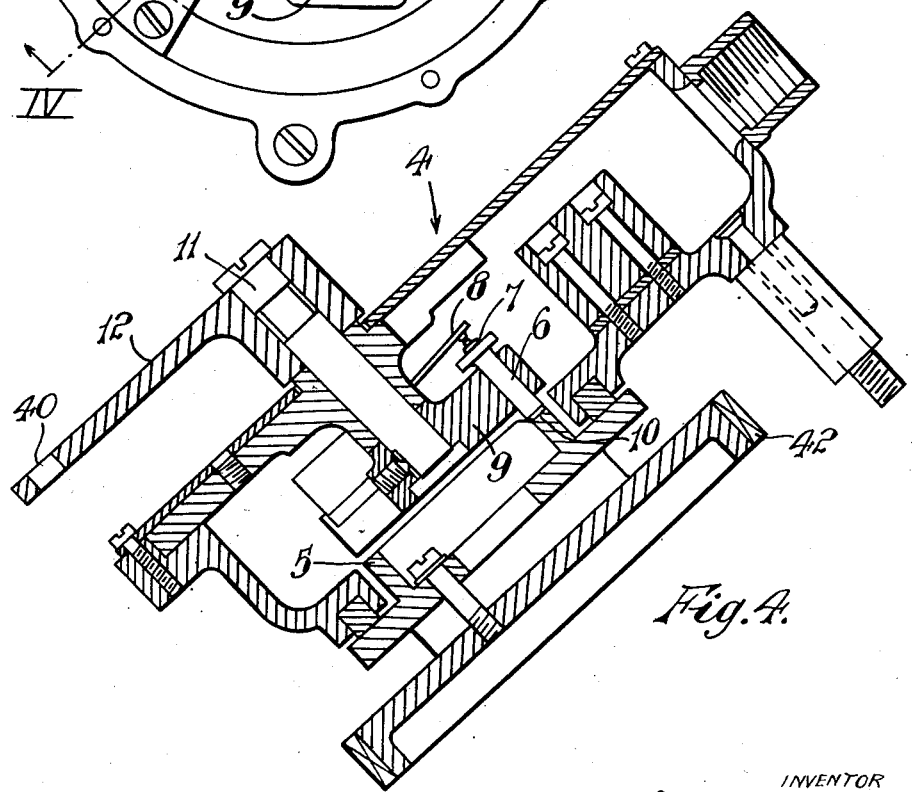
Figure 4 is a section of Figure 3 on the line IV—IV.

Referring to Figure 1 of the drawing which shows only the conveyor system of the machine, the machine to be driven is a packet wrapping machine in which the packets are moved along the bed of the machine by pusher pieces 1 on a conveyor 2 and it is desired to stop the machine so that a pusher piece is always in a predetermined position with respect to a fixed point of the machine. The machine is driven by an electric motor 3 which is controlled in the manner described in the above mentioned specification and a timing switch generally indicated by the reference numeral 4 is provided for instituting dynamic braking as therein described. The switch 4, Figures 3 and 4, comprises a rotatable crown cam 5 adapted to engage and move a plunger 6 which disengages the switch contacts 7 and 8. The plunger is slidable in a switch body 9 made of insulating material and in line with the free ends of the two switch contact springs 7 and 8 which are also secured to the said body. The cam presses on the plunger and holds the switch contacts in engagement during the major part of the cam revolution but when the plunger is free to move into a depression 10, Figure 4, in the cam contour under the pressure of the contact springs the spring contacts are separated and dynamic braking occurs as described in the above mentioned British patent. Thus, referring to Figure 5 which illustrates diagrammatically certain of the elements shown in the said British patent, and in a simplified arrangement of these elements, the motor 3 is illustrated as supplied with a series winding 50 and a shunt winding 51. The motor armature and the series winding 50 are short circuited on the closing of a magnetically actuated switch 53, which is normally retained in the open position but which is closed upon the opening of rotary switch 4, whereby motor 3 is dynamically braked. Other elements of the circuit, deemed unnecessary to the showing in this application, are illustrated and described in full in the aforesaid British patent.

The body of the switch is mounted for rotation on a spindle 11 which is co-axial with the operating cam and the spindle has a lever 12 fixed to it whereby the switch body may be shifted around the axis of the spindle. It will be seen that when the lever is moved, the instant of disengagement of the spring contacts will be advanced or retarded as the plunger is shifted relatively to the cam.

Figure 2:
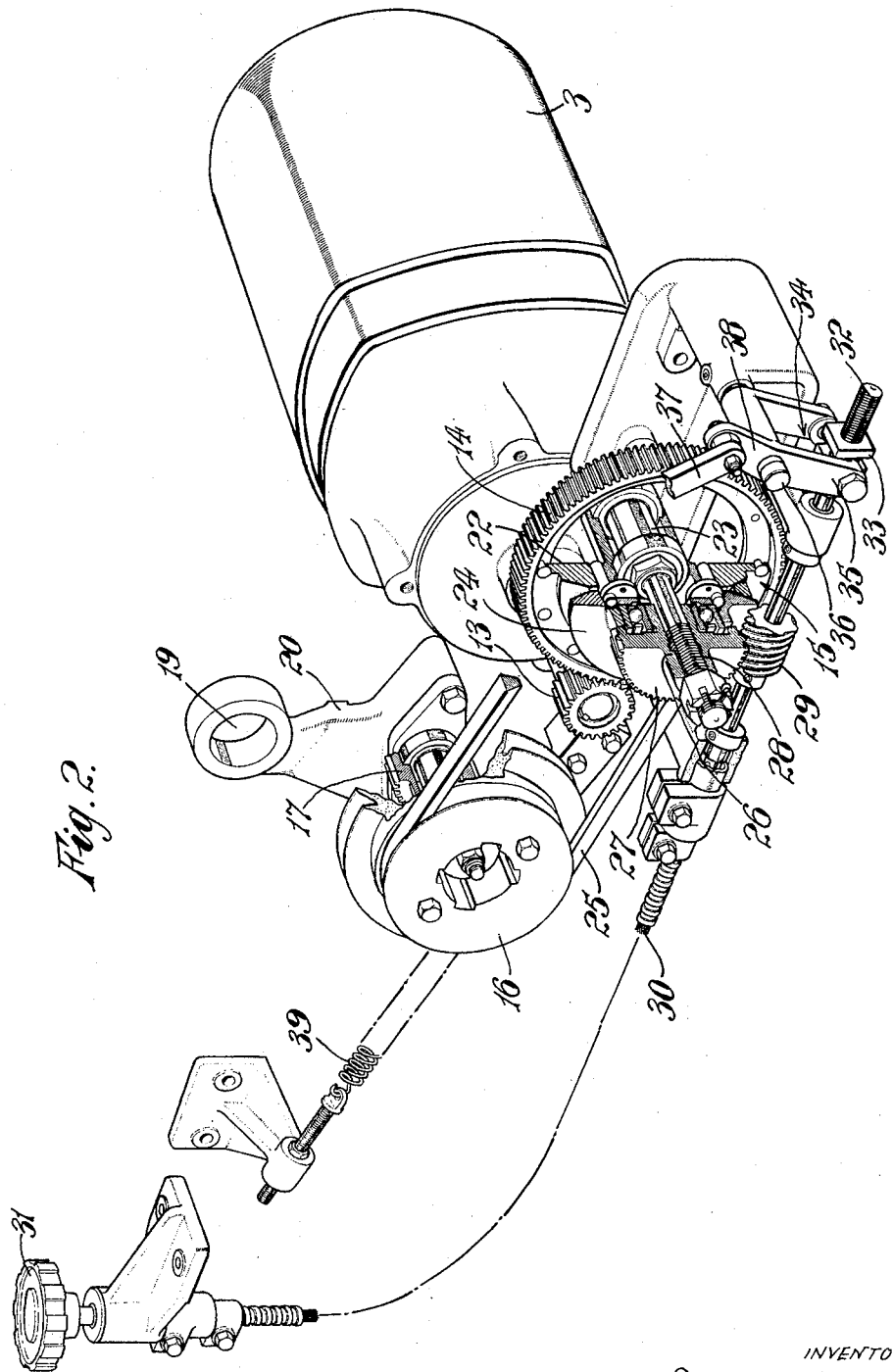
Figure 2 is a perspective view of the driving motor and variable speed gear used for driving the machine shown in Figure 1.

Referring also to Figure 2, electric motor 3, which drives the machine has a small gear wheel 13 on its shaft which drives a large gear wheel 14 to which is attached a V pulley, generally indicated by the reference 15. This pulley drives a similar pulley 16 which is geared to the main shaft of the packet wrapping machine, by means of a small gear wheel 17 fixed to the pulley and engaging a larger gear wheel 18, Figure 1, which is concentric with a hole 19, Figure 2, in a quadrant 20 by which the quadrant is pivotally mounted on the axis of the driving shaft 21, Figure 1, of the wrapping machine. The pulley geared to the shaft is of the adjustable type and consists of a half pulley 22 rotatable on a stub shaft 23, but immovable thereof axially, and a half pulley 24 rotatable on and axially movable along said fixed shaft so that as one half of the pulley is moved towards or away from the other half the effective driving diameter of the pulley will alter. The pulleys 15 and 16 are connected by a V belt 25. The movement of the second half 24 of the pulley 15 is effected by means of a threaded bush 26 which is operated as described below so as to move on half of the pulley axially of the fixed shaft. The bush is attached to a worm wheel 27 and mounted on a threaded portion 28 of the fixed shaft 23 on which the pulley rotates and the worm 29 which engages with the wheel is coupled by means of a flexible cable 30 to any suitable part of the machine where a knob, hand wheel, or the like 31 is provided whereby the operator can rotate the worm to alter the speed of the machine. Movement of the bush towards the fixed half of the pulley moves the halves together and movement of the bush in the reverse direction opens the groove of the pulley. During the movement the wormwheel traverses with the bush but as the movement is small it is sufficient to allow the wormwheel to slide across the worm. On the worm shaft there is a threaded portion 32 which engages with a nut 33, suitably guided, so that as the worm shaft is rotated, the nut is traversed along the shaft. A bell crank lever generally indicated by the reference 34, is connected by one arm 35 to the nut so that movement of the nut causes the lever to swing about its pivot 36, and a link 37 connects the other arm 38 of the lever with the previously mentioned lever 12 which is fixed to the spindle of the switch body.

The V belt is held taut during all adjustments of the variable speed drive by a spring 39 which pulls on the quadrant 20 which swings around the axis of the driving shaft of the machine as the gear is adjusted.

It will be seen therefore that as the knob or hand wheel 31 is manipulated to alter the speed of the machine the switch body 9 will be correspondingly advanced or retarded with respect to the cam 5 so that the moment at which the contacts 7, 8, disengage is determined by the speed at which the machine is running.

The cam 5 is of course, rotated in timed relationship with the machine and geared thereto according to the speed of the moving part which it is desired to stop in a given position. In Figure 1, the pitch of the pushers 1 is equal to the circumference of wheels 43 on which the conveyor 2 is supported and in order to rotate the cam 5 in unison with the pusher movements the cam is fixed to a gear wheel 42, Figure 4, and driven by a gear wheel 41 of the same diameter fixed to the shaft 21.

It will also be noted that the switch lever 12 shown in Figure 1 is of quadrant shape and provided with a slot 40 in which the end of the link 37 may be adjustably fixed. The purpose of this is to enable the device to be adjusted to cover variations in the performance of different motors of the same nominal rating used on two or more machines. There is also some difference in the ease of running of machines of the same construction. New ones are naturally stiffer than old ones and even between several new ones there are differences in running. Also the loading of a machine may vary due to differences in the quality and weight of the wrapping material and other factors.

It will be appreciated that as only one half (24) of the pulley 15 is shifted the centres of the pulleys 15 and 16 are not always in line. This is not inconvenient with the construction shown, but where a large range of speeds may be required the pulley 16 could be slidable on splines so as to keep the belt alignment correct at all speeds.

In this way it is found that a machine driven as above described will always stop when the moving parts are in the desired position relative to a fixed point of the machine.

What I claim as my invention, and desire to secure by Letters Patent is:

1. In apparatus for controlling the dynamic braking of a machine driven by variable speed gearing, the combination with mechanism for adjusting the ratio of said gearing, of a timing switch driven by said machine for initiating dynamic braking of said machine, devices operable to advance or retard the instant of operation of said switch, and connections between said gearing adjusting mechanism and said devices whereby the timing of said switch is altered concurrently with variation in the ratio of said gearing.

2. In apparatus for controlling the dynamic braking of a machine driven by variable speed gearing, the combination with the machine, of a driving motor, variable speed gearing interposed between said motor and said machine to drive the latter at a selected speed, a circuit having a timing switch therein for initiating dynamic braking of said motor, means driving said timing switch from said machine, devices operable to advance or retard said timing switch with respect to said machine, mechanism for adjusting the speed ratio of said variable speed gearing, and connections between said mechanism and said devices for effecting alteration of the timing of said switch in response to operation of said mechanism.

JAMES ARTHUR MASON.

REFERENCES CITED

The following references are of record in the file of this patent:

UNITED STATES PATENTS

| Number | Name | Date |
|---|---|---|
| 657,516 | Coleman | Sept. 11, 1900 |
| 1,411,712 | Diehl | Apr. 4, 1922 |
| 1,587,645 | Hicguet | June 8, 1926 |
| 1,779,919 | Shoemaker | Oct. 28, 1930 |
| 2,350,913 | Mercer | June 6, 1944 |
| 2,493,670 | Harvey et al. | June 3, 1950 |